United States Patent Office 3,549,625
Patented Dec. 22, 1970

3,549,625
NITROFURAN DERIVATIVES OF PSEUDOUREAS
Hermann Breuer, Regensburg, Germany, assignor to E. R. Squibb & Sons, Inc., New York, N.Y., a corporation of Delaware
No Drawing. Filed Dec. 5, 1967, Ser. No. 687,980
Claims priority, application Germany, Dec. 9, 1966, 1,543,509
Int. Cl. C07d 5/46
U.S. Cl. 260—240
15 Claims

ABSTRACT OF THE DISCLOSURE

This invention relates to antimicrobially active nitrofuran derivatives of pseudoureas having the general formula

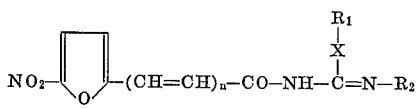

in which $R_1$ represents a straight or branched chain alkyl group, alkoxyalkylene, alkylthioalkylene, cycloalkyl or alkyl, $R_2$ represents hydrogen or an acyl group, X represents oxygen or sulfur and $n$ represents 0 or 1.

SUMMARY OF THE INVENTION

This invention relates to nitrofuran derivatives of pseudoureas having the formula (I)

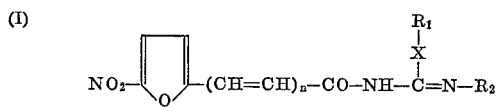

This formula may also be written in the tautomeric form (II)

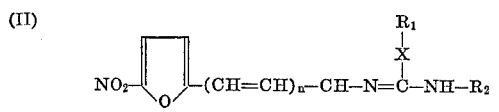

Formula I will be used herein as representative of both tautomeric forms.

$R_1$ in the formula represents a straight or branched chain lower alkyl group such as methyl, ethyl, propyl, isopropyl, butyl, isobutyl, t-butyl, amyl or the like. It also represents a lower alkoxy-lower alkylene or lower alkylthio-lower alkylene group in which the alkyl chains may be straight or branched, e.g., methoxymethylene, methoxyethylene, ethoxymethylene, ethoxyethylene, methylthiomethylene, ethylthiomethylene and the like. $R_1$ also represents a cycloalkyl group of 3 to 8 carbon atoms, e.g. cyclopropyl, cyclobutyl, cyclopentyl, cyclohexyl and cyclooctyl, as well as aralkyl groups, preferably phenyl-lower alkyl groups such as benzyl, phenethyl and the like.

$R_2$ may represent hydrogen, but preferably it represents an acyl group, especially a lower alkanoyl group such as acetyl, propionyl, butyryl or the like, or benzoyl, monosubstituted benzoyl, e.g., halobenzoyl, nitrobenzoyl, lower alkyl-benzoyl and the like. In a more preferred form the acyl group is a nitrofuroyl or a nitrofuranacryloyl group so that there is obtained a bis compound of the formula (III)

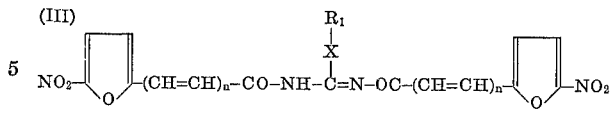

In all of the foregoing formulas X represents oxygen, which gives the pseudourea series of compounds, or sulfur, which gives the thiopseudourea series and $n$ is 0 or 1.

The foregoing compounds of this invention are useful as antimicrobial agents, e.g., in combatting organisms such as *Trichomonas vaginalis, Trichomonas foetus, Staphylococcus aureus, Salmonella schottmuelleri, Pseudomonas aeruginosa, Proteus vulgaris, Escherischia coli, Trychophyton mentagrophytes*, as well as other species of such genera or the like. For example, they may be administered orally to various animal species, e.g., mice in an amount of about 5 to 25 mg./kg./day, preferably in 2 to 4 divided doses, in any of the conventional oral dosage forms, or topically in creams in equivalent amounts. They may be used as surface disinfectants. About 0.01 to 1.0% by weight of any of these substances may be dispersed on an inert solid or in a liquid such as water and applied as a dust or spray or incorporated in a soap or other cleansing agent such as a solid or liquid detergent composition. The latter may be used, for example, in general cleaning, in cleaning dairy barns or dairy, food handling or food processing equipment.

The compounds of this invention may be prepared by several methods as described hereinafter. The symbols have the meaning described above. According to one method, a pseudourea derivative of the formula (IV)

or its salt with an inorganic acid is treated with a 5-nitro-2-furoyl or 5-nitro-2-furanacryloyl compound to first introduce a 5-nitro-2-furoyl group or a 5-nitro-2-furanacryloyl group. Then, if desired, a second acyl group may be introduced into the molecule. In order to obtain the N,N'-diacylated compounds of this invention, the introduction of the acyl groups may also be effected in the reverse order. If the same acyl group is introduced on each nitrogen atom, the reaction may be carried out so as to add both acyl groups in a single step (e.g. by adjusting the proportions of reactants). The following flow schemes are illustrative of the alternate routes:

(V)

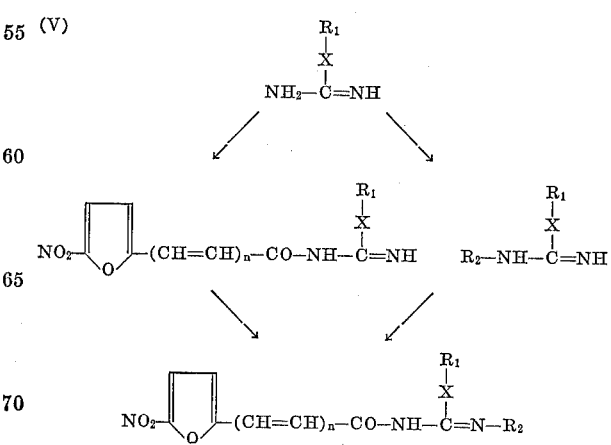

An alternative method for preparing compounds of this invention comprises converting an acylcyanamid with an alcohol or mercaptan to the monoacyl pseudothiourea derivative, if desired, introducing another acyl group according to the following reaction scheme.

(VI)

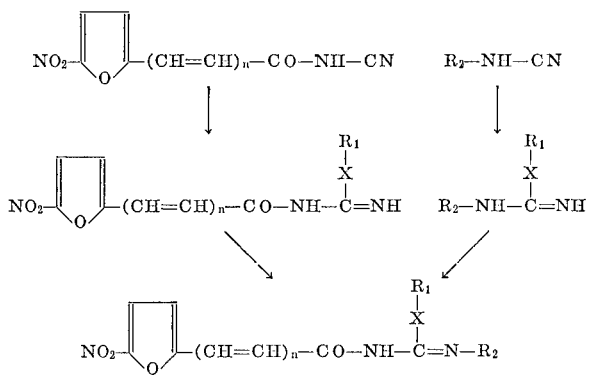

As a further alternative an N,N'-diacylcarbodiimide may be used as starting material and converted with an alcohol or mercaptan as follows:

(VII)

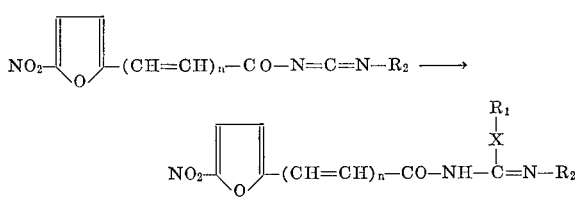

Finally, compounds of this invention may be prepared by nitrating a furan substituted pseudourea or pseudothiourea as follows:

(IX)

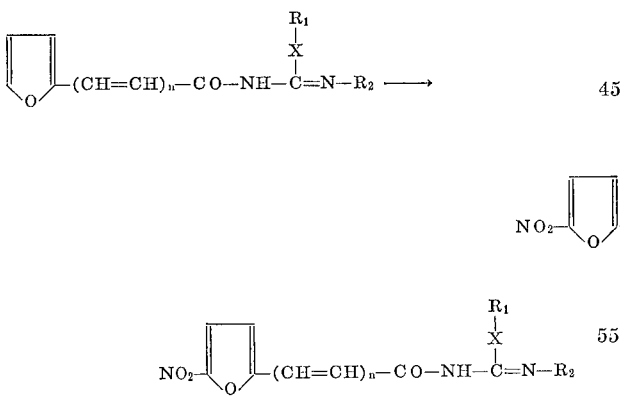

The following examples are illustrative of the invention.

EXAMPLE 1

(a) 13 grams of O-methyl pseudourea sulfate are dissolved in 150 ml. of pyridine and a solution of 18 gms. of 5-nitrofuranacrylic acid chloride in 120 ml. of dry chloroform is added dropwise. This is stirred for four hours at room temperature, the solvent is distilled off under vacuum, the residue is washed with water and sodium bicarbonate and filtered under suction. The yield amounts to 80% of theory. The 2-methyl-1-(5-nitro-2-furanacryloyl)pseudourea is recrystallized from dioxane, M.P. 238–240° C. with dec.

(b) The product of part (a) is acylated by adding to a solution of 2-methyl-1-(5-nitro-2-furanacryloyl)pseudourea in pyridine a solution of acetyl chloride in dry chloroform to obtain 3-acetyl-2-methyl-1-(5-nitro-2-furanacryloyl)pseudourea.

EXAMPLE 2

To a suspension of 14 grams of S-methyl pseudourea sulfate in 150 ml. of dry pyridine is added dropwise a solution of 26 gms. of 5-nitro-2-furanacrylic acid chloride in 250 ml. of dry chloroform with slight cooling. After the addition of the acid chloride a precipitate forms. This is stirred for three hours at room temperature and then the solvent is evaporated under vacuum.

The residue is washed with water and sodium bicarbonate, then filtered under suction. The product is recrystallized from dioxane. The yield amounts to 70% of theory.

The product, 2-methyl-1,3-bis[5-nitro-2-furanacryloyl]-2-thiopseudourea has a melting point of 210° C., with dec.

EXAMPLE 3

10 grams of N,N'-di(5-nitro-2-furoyl)carbodiimide-pyridine complex are suspended in 50 ml. of pyridine and the suepension, after the addition of 20 ml. of ethanol with stirring, is heated for about 30 minutes until a clear solution results. The solution is evaporated to dryness, the residue is taken up in a little ethanol and the crystals are filtered under suction. 3.6 gms. of 2-ethyl-1,3-bis[5-nitro - 2 - furoyl)pseudourea are obtained. The product is recrystallized from dioxane and melts at 201–202° C.

EXAMPLE 4

100 ml. of ethylene glycol monomethyl ether are heated to 80°. 10 gms. of N,N'-di(5-nitro-2-furoyl)carbodiimide are added with stirring and the mixture is cooled to room temperature as soon as a clear solution is obtained. The crystals which precipitate upon the addition of water are filtered under suction and recrystallized from ethylene glycol monomethyl ether.

The yield amounts to 3.7 gms. of 2-(2-methoxyethyl)-1,3-bis(5-nitro-2-furoyl)pseudourea, M.P. 140–141° C.

EXAMPLE 5

Additional compounds having the following formula and the substituents indicated in the table may be produced by the procedure of the example also indicated in the table, substituting the appropriately substituted reactant:

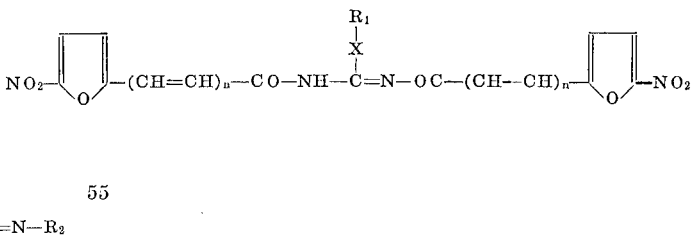

| | Procedure of Example— | $R_1$ | X | n |
|---|---|---|---|---|
| (a) | 2 | $C_2H_5SC_2H_4$ | S | 1 |
| (b) | 2 | $C_6H_{11}$ | O | 1 |
| (c) | 3 | $C_6H_5CH_2$ | S | 0 |
| (d) | 2 | $C_6H_5C_2H_4$ | O | 1 |
| (e) | 3 | $C_5H_9$ | O | 0 |
| (f) | 2 | $C_6H_{11}$ | S | 1 |
| (g) | 2 | $C_6H_5CH_2$ | S | 1 |

EXAMPLE 6

Additional compounds having the following formula and the substituents indicated in the table may be produced by the procedure of the example also indicated in the table, substituting the appropriately substituted reactant:

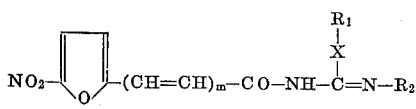

| Procedure of Example— | R₁ | R₂ | X | n |
|---|---|---|---|---|
| (a) | C₂H₅ | H | O | 0 |
| (b) | CH₃ | H | S | 1 |
| (c) | CH₃ | H | S | 0 |
| (d) | C₂H₅SC₂H₄ | CH₃CO | S | 1 |
| (e) | C₆H₁₁ | C₆H₅CO | O | 1 |
| (f) | C₅H₉ | 4—Cl—C₆H₄CO | S | 1 |
| (g) | C₆H₅C₂H₄ | 4—NO₂—C₆H₄CO | O | 1 |
| (h) | C₆H₁₁ | C₃H₇CO | O | 0 |
| (i) | C₆H₅CH₂ | C₂H₅CO | S | 1 |

What is claimed is:
1. A compound of the formula

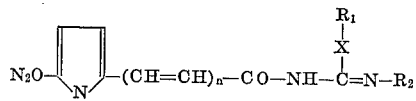

wherein $R_1$ is lower alkyl, lower alkoxy-lower alkylene, lower alkylthio-lower alkylene, cycloalky of 3 to 8 carbon atoms or phenyl-lower alkyl, $R_2$ is hydrogen, lower alkanoyl, benzoyl, halobenzoyl, nitrobenzoyl, lower alkylbenzoyl, nitrofuroyl or nitrofuranacryloyl, X is oxygen or sulfur and $n$ is 0 or 1.

2. A compound of the formula

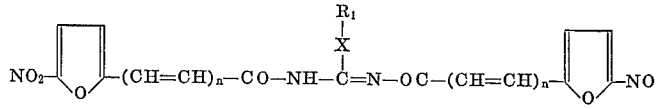

wherein $R_1$, X and $n$ have the same meaning as in claim 1.
3. A compound as in claim 1 wherein $R_1$ is lower alkyl, $R_2$ is hydrogen, X is oxygen and $n$ is 0.
4. A compound as in claim 1 wherein $R_1$ is lower alkyl, $R_2$ is hydrogen, X is oxygen and $n$ is 1.
5. A compound as in claim 1 wherein $R_1$ is lower alkyl, $R_2$ is hydrogen, X is sulfur and $n$ is 1.
6. A compound as in claim 2 wherein $R_1$ is lower alkyl, X is oxygen and $n$ is 0.
7. A compound as in claim 2 wherein $R_1$ is lower alkyl, X is sulfur and $n$ is 0.
8. A compound as in claim 2 wherein $R_1$ is lower alkyl, X is oxygen and $n$ is 1.
9. A compound as in claim 2 wherein $R_1$ is lower alkyl, X is sulfur and $n$ is 1.
10. A compound as in claim 2 wherein $R_1$ is lower alkoxy-lower alkylene, X is oxygen and $n$ is 0.
11. A compound as in claim 2 wherein $R_1$ is lower alkoxy-lower alkylene, X is oxygen and $n$ is 1.
12. A compound as in claim 4 wherein the lower alkyl group is methyl.
13. A compound as in claim 6 wherein the lower alkyl group is ethyl.
14. A compound as in claim 9 wherein the lower alkyl group is methyl.
15. A compound as in claim 10 wherein the lower alkoxy-lower alkylene group is methoxyethylene.

References Cited
UNITED STATES PATENTS
2,779,669  1/1957  Snyder _____ 71—2.6

HENRY R. JILES, Primary Examiner
G. T. TODD, Assistant Examiner

U.S. Cl. X.R.
260—347.2, 347.3; 424—285

PO-1050
(5/69)

UNITED STATES PATENT OFFICE
CERTIFICATE OF CORRECTION

Patent No. 3,549,625         Dated December 22, 1970

Inventor(s) Hermann Breuer

It is certified that error appears in the above-identified patent and that said Letters Patent are hereby corrected as shown below:

The formula in Claim 1 should read as follows:

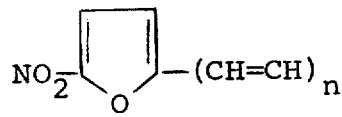

Column 5, line 36, "cycloalky" should read cycloalkyl

The formula in Claim 2 should read as follows:

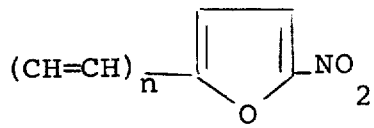

Signed and sealed this 25th day of May 1971.

(SEAL)
Attest:

EDWARD M. FLETCHER, JR.
Attesting Officer

WILLIAM E. SCHUYLER,
Commissioner of Paten